Jan. 28, 1936.                H. ERNST ET AL                  2,028,766
                            UNIFORM FEED SYSTEM
                        Filed Nov. 17, 1927        2 Sheets-Sheet 1
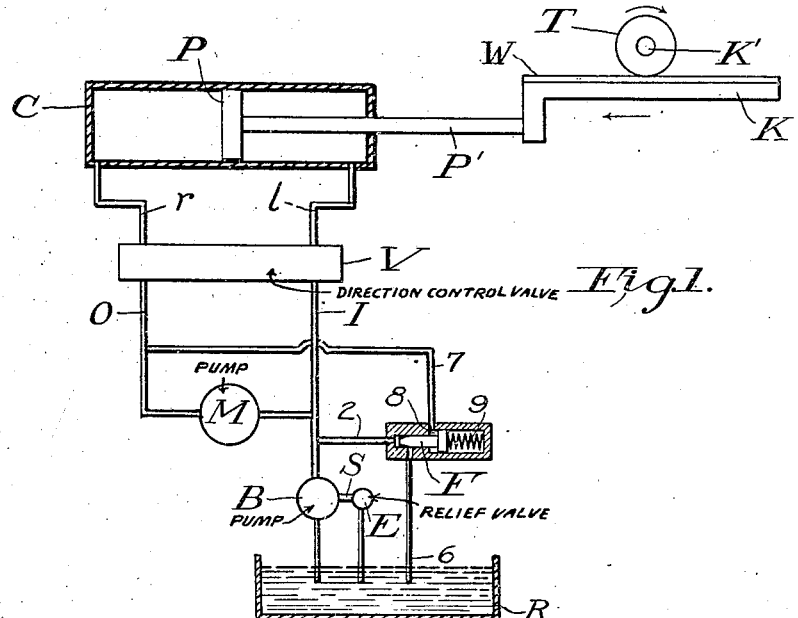
Fig. 1.
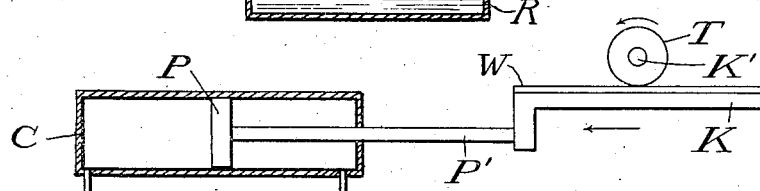
Fig. 2.
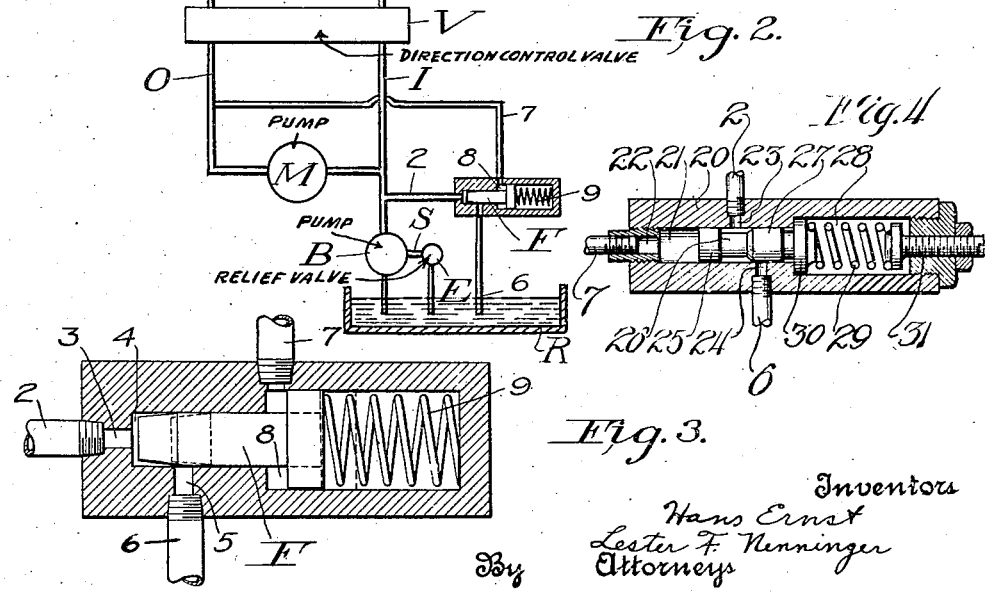
Fig. 3.
Fig. 4.
Inventors
Hans Ernst
Lester F. Nenninger
By Attorneys
Nathan & Bowman

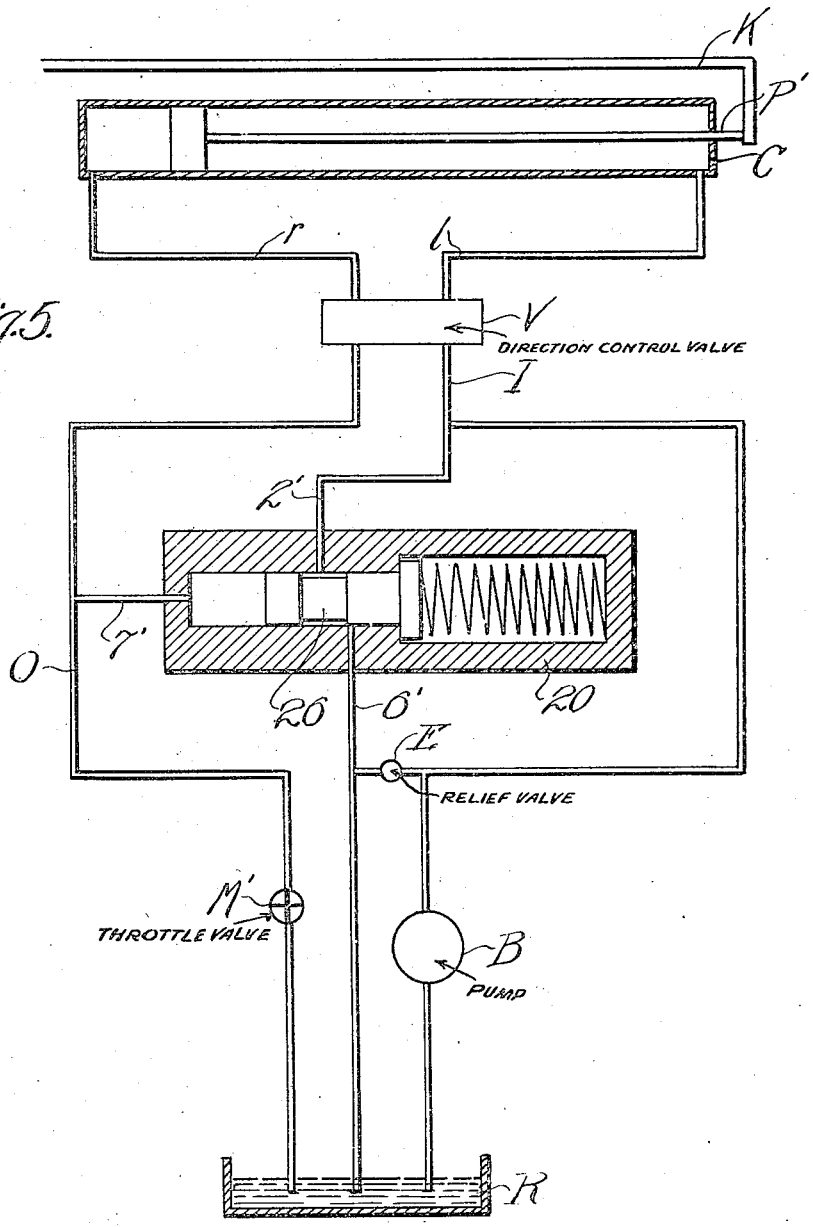

Patented Jan. 28, 1936

2,028,766

UNITED STATES PATENT OFFICE 2,028,766

UNIFORM FEED SYSTEM

Hans Ernst and Lester F. Nenninger, Cincinnati, Ohio, assignors to The Cincinnati Milling Machine Company, Cincinnati, Ohio, a corporation of Ohio Application November 17, 1927, Serial No. 233,972

14 Claims. (Cl. 90—21.5)

This invention is devoted to the proposition of maintaining automatically any desired adherence to uniformity in the rate of travel of an hydraulically-propelled work or tool carrier under the influence of tooling operations of fluctuating or different resistances.

Hydraulic propulsions are, generally speaking, of two distinct types; the one now in general usage seeking to determine the rate of advance by undertaking primarily to control the flow of what may be termed the "pushing" oil, and the other type operating primarily to oppose the advance by a supply of oil diminished at a volumetrically uniform rate by a metering escapement.

The latter type has been fully set forth in applications now pending (Serial No. 128,167 filed August 9, 1926, and Serial No. 220,721 filed September 15, 1927) and the present application proposes an invention readily combinable therewith to effect an improvement in the methods, apparatus and systems of said co-pending applications. How it may either be so combined or otherwise adapted will best be made sufficiently apparent to those skilled in the art by way of an explanation of this invention in connection with simple diagrams rather than elaborate drawings of involved machines.

Figure 1 is a diagram representing conditions where a tool is so moved as to assist in the "feed" of the work. Fig. 2 is a diagram representing converse conditions where the relation of the tool to the work is such as tends to oppose the "feed". Fig. 3 is a diagram depicting one type of a control device such as may be utilized as one of the sub-combinations of the system. Fig. 4 is a longitudinal section of a balanced type of valve providing means for effecting a manual adjustment; and Fig. 5 is a diagrammatic representation of this control as applied to a system in which a hand-throttle provides the escapement from the back-pressure line.

According to the type of machine tool in hand, the tool or the work may be moved at the feeding rate, and the one or the other may simultaneously be driven at an independent speed. Of this, a milling-machine is a good example and hence has been referred to in illustrating the applicability of this invention. So also, a piston and cylinder is an elementary type of hydraulic motor or actuator and has been, accordingly, referred to in the accompanying diagrams; it being apparent that either the piston or the cylinder may be the travelling element and, by reason of being mechanically connected to the tool or work carrier, may be regarded as a part thereof. These terms are accordingly used herein, as is the term oil, as words of convenience rather than as limitations.

In the diagrams, M represents a metering escapement pump which receives or withdraws oil from the outlet line O and delivers it into the inlet line I. This pump is so constructed or so driven that it passes oil at a volumetrically uniform rate. Usually, the machine-tool will require different "set-ups" for tooling different classes of work or material, etc., so that a selection of rates of feed should be available at the option of the user. The pump or its rate of drive accordingly admits of adjustment to yield a selective series or ranges of predetermined rates; each being volumetrically uniform.

While the directions of flow may be changed by reversing the delivery of the pump, it is usually more convenient to accomplish this by means of an appropriate valve, represented by V, which may be shifted to establish communication of the outlet line O with either end of the cylinder C through lines $r$ or $l$; and likewise for the inlet line I.

Supplementing the action of the adjustable pump M (which has a relatively high maximum capacity) is a high-pressure booster-pump B which, more conveniently, is non-adjustable and runs continuously at a constant speed and delivers but a small excess of oil. Its purpose is to augment the pressure and quantity of the advance-urging oil that is derived from the pipe line I and to render available (when it may be desired) a predetermined maximum pressure representing the ultimate working capacity of the machine. To prevent it from exceeding that maximum, a shunt line S will lead through a suitable relief agency to a reservoir R from which the booster-pump derives its supply. This agency in its simplest form may be a relief valve E controlled by a spring that admits of adjustment in tension.

In practice, the system as above outlined, will usually embody numerous refinements and improvements but as these have been fully detailed in the copending applications identified in the above, and as a repetition thereof would lead to much elaboration, they have been omitted in the interest of clearness and brevity.

The cutter is symbolically represented by T; the work by W; the tool and work carriers by K' and K, respectively; and the mechanical connection between the piston P and one of these carriers is indicated by a piston rod P'.

In this system, the rate of advance of the piston is determined by the rate of withdrawal of the oil from its forward side; pressure being maintained on its rear side to cause it to advance at the rate permitted by the aforesaid withdrawal. The withdrawal is accomplished by a pump in the nature of a metering device which is driven at a uniform rate. It will therefore withdraw oil at a volumetrically uniform rate; the rate being selective in accordance with the adjustment given the pump.

If the travel of the piston is to be at a uniform rate, without increment or decrement, and as the metering device can do no more than withdraw the oil at a volumetrically uniform rate, it will be seen that the ability of the piston to advance at a uniform rate presupposes no volumetric variations in the oil itself. But oil is appreciably compressible and therefore subject to variations in volume is subjected to variations in pressure, and if its volume be varied through such pressure variations, the rate of advance of the piston will be subject to corresponding variations not withstanding the ability of the metering device to compel the passage of oil at a volumetrically constant rate. Consequently, it is desired that the aggregate pressure on the other side of the piston (the pressure that is urging it forward) shall remain constant. The aggregate pressure is the hydraulic pressure plus or minus (as the case may be) the mechanical pressure transmitted to the piston rod. This mechanical pressure will be additive when the cutter is trying to feed the table and will be subtractive when it is opposing the feed of the table. It may also fluctuate additively and subtractively; depending respectively upon whether the cutter is rotating with the feed or, as is more conventional, rotating against the feed.

The oil for urging forward the piston is derived from two sources; first, the larger volume delivered by the metering device and second, the small quantities delivered under high pressure by the low capacity boosting pump. The pressure in the urging line is determined by a third device in the nature of an escapement or relief valve. By controlling the adjustment of this third device, the pressure of the oil employed for urging the piston forward may be modified or regulated. By increasing or decreasing the by-pass escapement of oil through the third device, the pressure may be increased, decreased or maintained constant according to the nature of the regulation.

Fig. 3 represents one form of this device. A pipe line 2 receives oil from the high-pressure inlet line I, and conveys it to the port 3 leading into the valve-chamber 4, which has an outlet port 5 from which a pipe line 6 drains into the reservoir.

The flow may be arrested or permitted to any requisite extent by an appropriate valve-element F that rides over the port 5 and is so shaped that, beginning with a position of complete closure, it gradually opens the way to the port in any ratio desired per unit of shift. This is represented in the diagram by its tapered end.

It will now become apparent that the pressure in the inlet-line will correspond to the position of the valve-element F by virtue of the rate at which it permits the escape of excess oil. As it is shifted the one way and the other, so will the pressure in the inlet-line I assume different values.

A characteristic conception of this invention is that these values will essentially vary. This variable is primarily made a function of another variable; to wit, the force exerted on the piston as a result of the tooling operation. This force will be positive or negative, depending upon the direction of cut of the tool point on the work, and will fluctuate in intensity in correspondence with the varying resistances presented by the work to the tool during its progress. In other words, the aim is to respond to every alteration in the mechanical force exerted on the piston by an immediate change in the pressure of the piston-advancing oil; keeping the algebraic sum of the two very nearly constant.

To do this automatically, advantage is taken of the peculiarity that the piston itself, in pressing against the oil in the forward end of the cylinder, creates a back-pressure equal at all times to the algebraic sum of the mechanical urge and the advancing hydraulic urge. Things are so arranged that this back-pressure, in turn, becomes an agent for determining the position of the valve-element F and for cooperating with other means (of which one is here instanced as a spring) for actively shifting it to or fro as often and as much as may be needed to keep pace with the fluctuations of the mechanical force, or of its re-set values. A very simple device, structurally considered, enables this office to be exercised.

The valve-element F is extended into an adjoining chamber 8 which is in open communication with the back-pressure line O through the pipe 7. Within that chamber, is a piston on the end of the valve-element. A spring 9 urges the valve-element in such direction as tends to restrict the escape of oil from the inlet-line I. The back-pressure oil from pipe 7 acts in the opposite direction. As the valve herein shown is not of the balanced type with respect to its oil-escapement portion, the variable pressure on the inlet line I also operates to urge the valve-element F in the opposite direction. It is, in this particular form, therefore subjected to combined hydraulic pressures; the cumulative effect being in turn influenced by the ratio of the circular cross section of the stem to the annular surface presented to the back-pressure in the larger chamber. This ratio, which here is 1/1.25 may be selected according to requirements, such as degree of sensitiveness, etc.

Figure 4 illustrates the alternatively embodiable control device comprising a casing 20 having a valve chamber designated as an entirety by the numeral 21. This chamber has the inlet port 22 adapted to be coupled with the back pressure line O through pipe 7 and the ports 23 and 24 coupleable respectively with the high pressure inlet line I by pipe line 2 and with the reservoir by the outlet pipe line 6.

The distinction in this structure is that this provides a valve of the balanced type with respect to its oil escapement portion so that its entire actuation is effected by momentary variations in back pressure tending to be produced in the return line O by varying resistances presented by the work to the tool during its progress.

This pressure acts against the piston head 25 on valve stem 26 having the valve portion 27 controlling relief flow through port 24. To resist movement of the valve and restore it to position preventing relief flow under normal conditions the casing 20 is provided with auxiliary chamber 28 containing spring 29 acting on head 30 of the valve stem, the pressure of the spring being adjustable through plunger screw 31. This permits of the valve being set to maintain the desired back pressure.

Figure 5 diagrammatically illustrates substantially the same circuit as Figure 1 with the exception that the back pressure line O is utilized coupled by branch 7' with port 22 of the valve mechanism just described and a throttle valve M' replaces the pump member M. The return in this case is conducted from M' direct to the reservoir R and the actuating or forward pressure is supplied entirely by pump B. The operation of the mechanism and the automatic control of relief of forward pressure in conduit I through action of the back pressure on piston 25 is identical with the operation of the previously described circuits.

Experience has demonstrated that this invention is remarkably responsive to fluctuations in the mechanical force. Without it, the table of a milling machine operating under severe duty has been observed to travel with pronounced pulsations. With it, the pulsations are so diminished as to be hardly perceptible. This shows that its corrective action is virtually instantaneous; the oil having the property of transmitting a pulse at a speed corresponding to the velocity of a sound wave. The valve-element will flutter in immediate response to any fluctuations in the mechanical force exerted on the table; forthwith arresting any noticeable tendency towards variations in the compression of the back-pressure oil. Consequently, a uniformly running metering pump will not only pass oil at a volumetrically constant rate but also at a gravimetrically constant rate, and a uniformity of travel rate is ensured.

Another virtue of much consequence is that it economizes power. The inlet-line, through its aid, needs to deliver oil under the predetermined maximum pressure only when the cutting operation is such as to call for it. When tooling under less severe conditions, the oil is admitted to the cylinder under correspondingly less pressures.

Illustrative of the use of the balanced valve of Fig. 4, the cutter is supposed, in Fig. 2, to oppose a resistance to the advance of the table equal to an hydraulic pressure of 300 lbs./sq. inch. Now if 600 lbs. be selected as the desired back-pressure of the oil in advance of the piston, then it will be seen that the inlet-line must attain a pressure of at least 900 lbs. to advance the table. This may be assumed to be a maximum.

Now let the cutter turn the other way, as represented by diagram 1, and it will now exert a positive instead of negative propelling effect. If this also be 300 lbs., then the advancing oil need be under but 300 lbs. pressure in order that the back pressure shall be 600 lbs. This correction will be made by the flutter valve F and the machine will not require as much power to operate it, as before; to wit, when it had to deliver oil under 900 lbs. into the cylinder.

Just as the flutter-valve will automatically adjust the system for such radically different set-ups, so will it likewise continuously respond to whatever irregularities may occur in the mechanical forces created by the action of the cutter on the work during a tooling operation. It thus has the advantage of reducing to a minimum the jumping tendency of the table with variations in the cutting pressures, of reducing the maximum pressure obtainable in the circuit under various cutting conditions, and of reducing the power required in the circuit under all conditions.

While this invention has been described primarily from the viewpoint of maintaining the same back-pressure under all conditions of usage, it will be appreciated by those skilled in the art from what has been disclosed that, by suitably proportioning the effective areas of the valve-element F and the piston thereof, and by suitably selecting the type of its counter-acting spring, a wide range of desideratums may be achieved. Thus, the back-pressure, instead of being held constant, may be caused to assume some desirable relation to the pressure of the in-fed oil according to the conditions under which the machine is being used. So, also, while a constant-value relief-valve has been discussed as an independent element, to facilitate a grasp of the chief characteristics of this invention, it will be seen that by suitably forming the flutter valve it may additionally perform that office.

Having thus revealed this invention, we claim as new and desire to secure the following combinations and elements, or equivalents thereof, by Letters Patent of United States:—

1. A milling-machine combining a rotary cutter and a work table, the action of said cutter on a work-piece carried by said work-table affecting the movement of said table; an hydraulic motor for advancing said table; means for forcing oil into and for discharging it under back-pressure from said motor; a valve for regulating the pressure of the entering oil; and means for operating said valve by the combined pressures of the entering and the discharging oil.

2. A machine-tool combining a tool or work carrier subject to a variable load; an hydraulic motor for propelling it; a conduit to and a return from said motor; means for delivering oil to said conduit under a constant maximum pressure; means for maintaining a back-pressure in the oil in said return; a relief valve connected to receive and discharge oil from said conduit; and an hydraulic actuator operated by oil derived under back-pressure from said return and adapted to control said relief-valve and thereby so regulate the pressure in said conduit with respect to variations in said load that said back-pressure will be held substantially constant and the oil in said return will remain gravimetrically constant in volume.

3. An hydraulic system combining tool and work carriers; a piston for propelling one of said carriers; a source of oil leading to the rear side of said piston for continuously urging it in its direction of propulsion; a back-pressure oil line leading from the forward side of said piston and embodying means for withdrawing oil at a volumetrically uniform rate; and means sensitively responsive to momentary variations of pressure in said back-pressure line for so adjusting the piston-urging pressure as to maintain in said line a constant back-pressure irrespective of the mechanical force on said piston caused by the effort of a tooling operation.

4. An hydraulic system combining tool and work carriers; an hydraulically propelled element connected with one of said carriers; a supply of oil under back-pressure caused by a forward urge of said element; a metering device for diminishing said supply at a volumetrically uniform rate; a supply of oil under pressure for exerting a forward urge on said member; a valve for determining the pressure of said last-mentioned oil; a spring urging said valve in its pressure-increasing direction; and means actuated by said oil under back-pressure for urging said valve counter to said spring.

5. An hydraulic system combining tool and work carriers; a piston for propelling one of said carriers; an oil line leading from the forward side of said piston and embodying means for withdrawing oil at a volumetrically constant rate; a source of oil leading to the rear side of said piston for continuously urging it forward to create a back-pressure in said oil line; a device adapted to vary the pressure of the piston-urging oil; and means responsive to resultant variations in the back-pressure and adapted forthwith so to adjust said device as to change the pressure of the piston-urging oil.

6. A machine tool combining a tool or work carrier subjected to a variable load; an hydraulic motor for propelling it; a conduit to and a return from said motor; means for delivering under a constant maximum pressure oil to said conduit in greater amounts than required by said motor; a relief valve connected to receive and discharge excess oil from said conduit to moderate the pressure therein; a device arranged in said return to impede an unrestricted flow from said motor and to maintain a back-pressure in said return; and an hydraulic actuator operated by oil derived under back-pressure from said return and adapted to control said relief-valve and thereby so to regulate the pressure in said conduit with respect to variations in said load that said back-pressure will be held under a predetermined control.

7. An hydraulic system combining tool and work carriers; a piston for propelling one of said carriers; a source of oil leading to the rear side of said piston for continuously urging it in its direction of propulsion; a back-pressure oil line leading from the forward side of said piston and embodying means for withdrawing oil at a volumetrically constant rate; and means sensitively responsive to momentary variations of pressure in said back-pressure line for so adjusting the piston-urging pressure as to maintain in said line a uniform back-pressure irrespective of the mechanical force on said piston caused by the effort of the tooling operation.

8. An hydraulic system combining tool and work carriers; a piston for propelling one of said carriers; a feed oil-line leading to the rear side of said piston; a pump for supplying it with an excess of oil under pressure for continuously urging the piston in its direction of propulsion; a return oil-line leading from the forward side of said piston; means for so retarding the out-flow of oil through said return line that it will be under a back-pressure created by the forward urge of said piston; a device for passing excess oil from said feed line and adapted to determine the pressure therein; and means mutually responsive to the fluctuations in the pressure in each of said lines for so adjusting said device as to maintain in said back-pressure line a pressure not appreciably varied by changes in the mechanical force exerted on said piston as a result of irregularities in the tooling effort.

9. An hydraulic system combining tool and work carriers; a piston for propelling one of said carriers; an oil line leading from the forward side of said piston and embodying means for withdrawing oil at a selectively constant rate; a source of piston-urging oil leading to the rear side of said piston for continuously urging it forward to create a back-pressure in said oil line; a device adapted to vary the pressure of the piston-urging oil; and means responsive to resultant variations in the back and forward pressures and adapted forthwith so to adjust said device as to effect changes in the pressure of the piston-urging oil corresponding to predetermined values.

10. In hydraulic motors of the piston and cylinder type subject to variable loads, a pressure responsive device controlling a by-pass escapement of the fluid supply, said device being in communication with the outlet line so that the pressure therein actuates a component of said device to vary the by-pass escapement, whereby the delivery of the fluid to the motor is under a pressure varying in a predetermined relation to the variations in the load.

11. A hydraulic motor of the piston and cylinder type having a part subject to a variable load, for example, a work carrier, a conduit to and a return from said motor; means for delivering oil to said conduit under a constant maximum pressure; means for maintaining a back-pressure in the oil in said return; an escapement or relief valve connected to receive and discharge oil from said conduit; and an hydraulic actuator operated by oil derived under back-pressure from said return and adapted to control said escapement or relief valve and thereby so regulate the pressure in said conduit with respect to variations in said load that said back-pressure will be held substantially constant and the oil in said return will remain gravimetrically constant in volume.

12. A hydraulic motor of the piston and cylinder type according to claim 11 in which the valve for determining the pressure of the intake oil is spring urged in its pressure-increasing direction and is actuated by said oil under back-pressure counter to said spring.

13. A hydraulic system combining a motor of the piston and cylinder type subject to a variable load, a pump connecting the inlet and outlet lines of said motor, a boosting pump, a source of fluid supply for said boosting pump, and a pressure responsive device regulated by the pressure on the outlet side for controlling a by-pass leading from the boosting pump line back to the source of supply.

14. A machine-tool combining a work-table; an hydraulic motor for advancing said table; means for forcing oil into and for discharging it under back-pressure from said motor; a valve for regulating the pressure of the entering oil; and means for operating said valve by the combined pressures of the entering and discharging oil.

HANS ERNST.
LESTER F. NENNINGER.